United States Patent [19]

Underbakke et al.

[11] Patent Number: 5,169,197

[45] Date of Patent: Dec. 8, 1992

[54] LIFT LINK FOR HELICOPTER EXTERNAL LIFT OF DUAL HMMWV'S

[75] Inventors: Larry Underbakke, Ventura; Harold Kusano, Camarillo, both of Calif.

[73] Assignee: The United States of America as represented by the Secretary of the Navy, Washington, D.C.

[21] Appl. No.: 645,959

[22] Filed: Jan. 28, 1991

[51] Int. Cl.$^5$ .................. B64D 3/00; B66C 13/04
[52] U.S. Cl. .................. 294/81.1; 294/904; 244/137.4
[58] Field of Search .................. 294/81.1, 81.2, 81.21, 294/81.3, 81.5, 81.51, 67.3, 74, 904; 244/118.1, 118.2, 137.4

[56] References Cited

U.S. PATENT DOCUMENTS

| | | | |
|---|---|---|---|
| 1,169,693 | 1/1916 | Swedlund | 24/573.1 |
| 2,444,944 | 7/1948 | Minter | 280/456.1 |
| 2,987,340 | 6/1961 | Mattera | 294/904 X |
| 3,021,166 | 2/1962 | Kempel et al. | 294/904 X |
| 3,426,399 | 2/1969 | Jones | 269/48.1 |
| 3,439,937 | 4/1969 | Dixon | 280/426 |
| 3,567,249 | 3/1971 | Robinson | 280/204 |
| 3,747,970 | 7/1973 | Fathauer et al. | 294/81.1 |
| 3,787,068 | 1/1974 | Miller | 280/446.1 |
| 4,027,913 | 6/1977 | Youngers | 296/191 |
| 4,174,120 | 11/1979 | Freeman | 280/204 |
| 4,437,680 | 3/1984 | Della-Moretta | 280/446.1 |
| 4,473,334 | 9/1984 | Brown | 294/904 X |
| 4,553,719 | 11/1985 | Ott | 294/904 X |
| 4,681,335 | 7/1987 | Lederman | 280/446.1 |
| 4,913,480 | 4/1990 | Yohe | 294/81.1 |

FOREIGN PATENT DOCUMENTS

| | | | |
|---|---|---|---|
| 263087 | 4/1988 | European Pat. Off. | 294/81.21 |
| 364412 | 4/1990 | European Pat. Off. | 294/81.3 |
| 965950 | 10/1982 | U.S.S.R. | 294/81.51 |
| 1449510 | 1/1989 | U.S.S.R. | 294/81.51 |

Primary Examiner—Charles A. Marmor
Assistant Examiner—Dean J. Kramer
Attorney, Agent, or Firm—Ron Billi; Melvin J. Sliwka

[57] ABSTRACT

A lift link for external lift of dual High Mobility Multi-Wheeled Vehicle's (HMMWV's) includes first and second ends, the inner portion of each end pivotally attached to inner and outer sliders, respectively, said sliders communicating to provide axial movement for said lift link. In operation, a pair of lift links are attached to abutted rear ends of two HMMWV's. The links allow at least 4 degrees of movement for easy hook-up while maintaining the rigid platform necessary to transport the attached vehicles by helicopter lift.

18 Claims, 3 Drawing Sheets

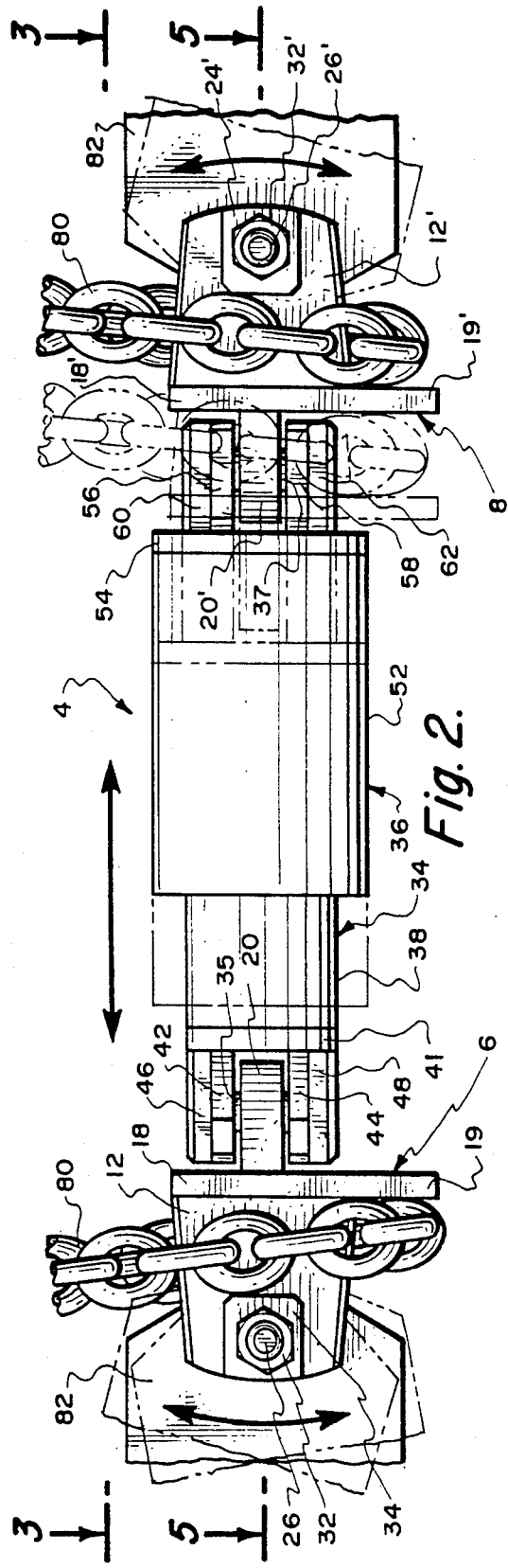
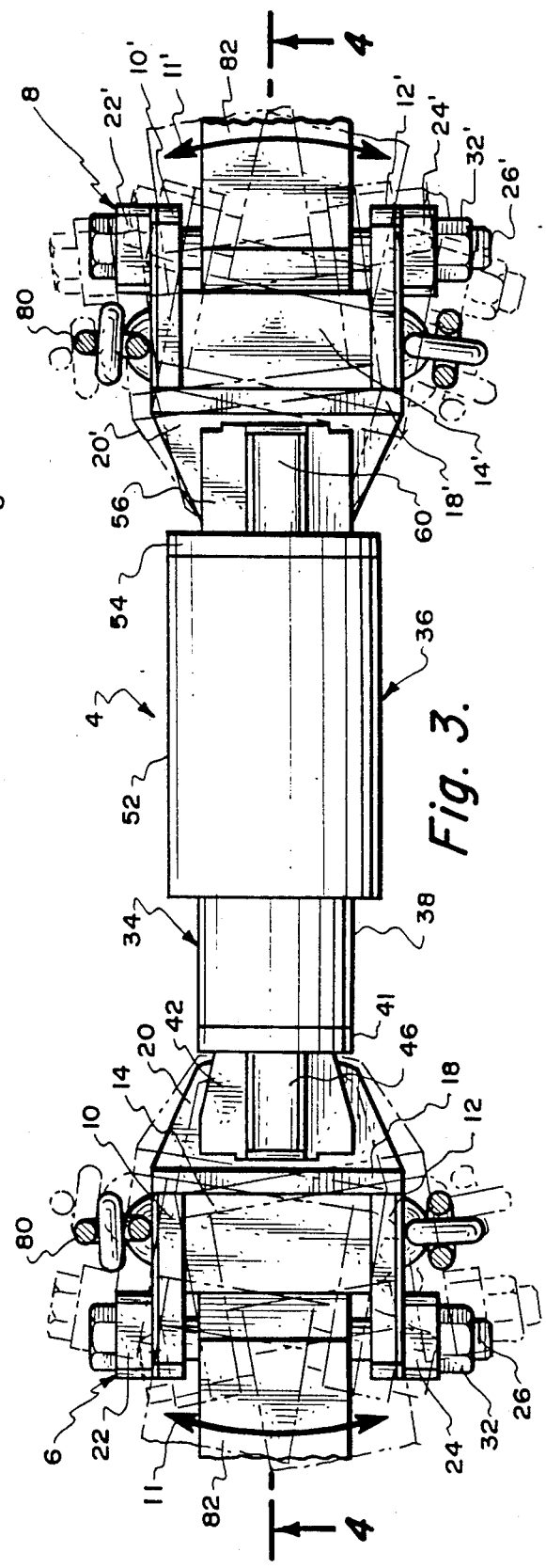

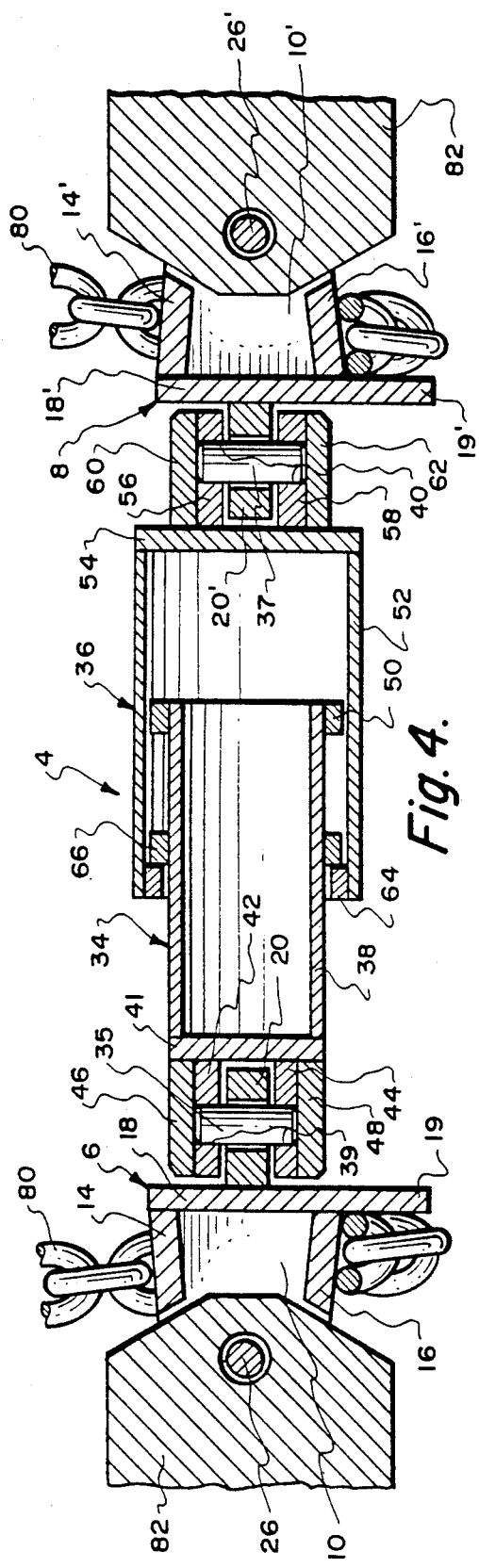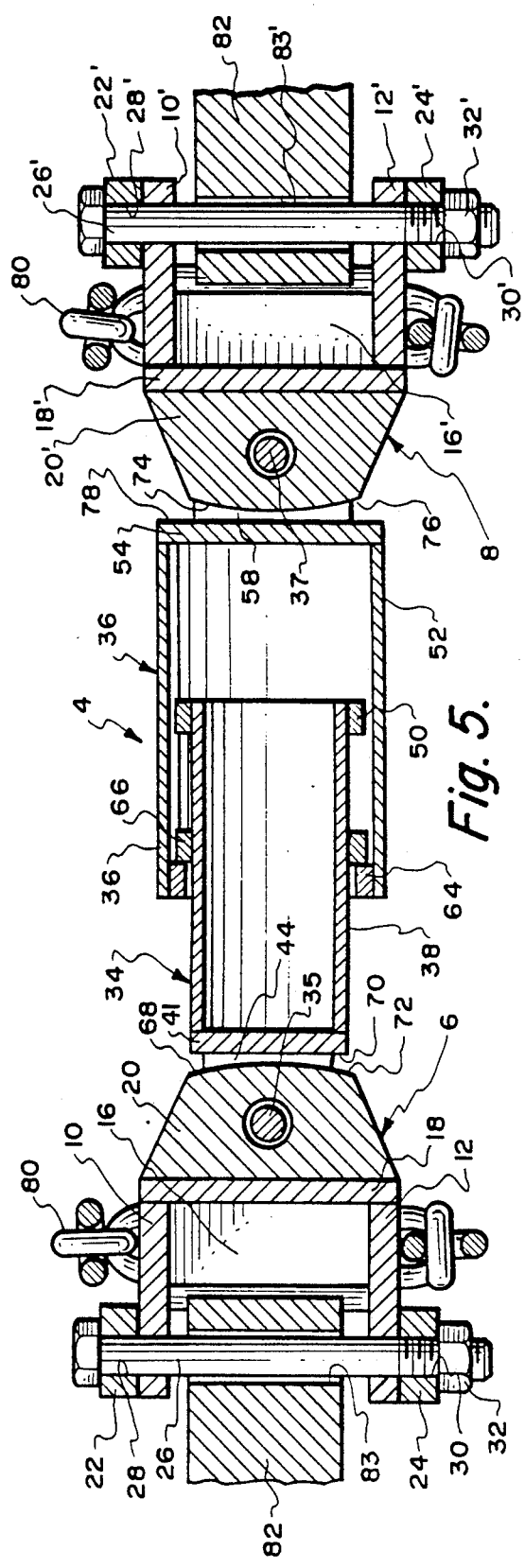

– 5,169,197 –

LIFT LINK FOR HELICOPTER EXTERNAL LIFT OF DUAL HMMWV'S

BACKGROUND OF THE INVENTION

This invention relates to a lift link for connecting two or more vehicles together so that a helicopter or other device may transport the vehicles through the air.

In the past, vehicles and other equipment have been moved or transported individually by helicopter by the use of slings attached, for example, to both ends of the lifted vehicle. This method provides fast, safe and reliable deployment of vehicular equipment such as High Mobility Multi-Wheeled Vehicle's (HMMWV's), tanks and artillery. However, the demands of modern warfare require the rapid deployment of vehicular equipment by helicopter in the most expedient manner possible dictating the necessity of deploying more than one vehicle at a time.

Accordingly, both rigid and flexible means have been utilized to attach two or more vehicles together for lifting by helicopter, the rigid means having the general form of a large, heavy frame and the flexible means having the general form of straps. However, these means have proved unsuccessful, the rigid means being heavy, cumbersome and unable to be carried on the vehicle and the flexible means being unable to maintain the necessary vehicular orientation in flight. Thus, there is a need in the art for providing a device that connects two or more vehicles or other equipment together and maintains the vehicles in a desired orientation when in flight yet is light, easily carried on the vehicle, easy and fast to hook up and is durable and strong. It is, therefore, an object of this invention to provide a lift link for attaching two or more vehicles together for maintaining the vehicles in a spaced and stable relationship when in flight and that is light, easy to carry on the vehicle, easy and fast to hook up and is durable and strong.

SUMMARY OF THE INVENTION

Accordingly, the lift link of the present invention includes first and second ends. The outer most portion of the first end is in the form of a first clevis for attachment to a first vehicle and the outer most portion of the second end is in the form of a second clevis for attachment to a second vehicle. The inner portions of the first and second ends are in the form of ears for pinned, pivotal attachment to an inner slider and an outer slider respectively. Stops are provided to limit the pivoted motion of the ears to approximately 12 degrees in either direction. The inner and outer sliders, slidably communicate to provide axial movement. Stops are provided to limit the amount of axial movement (i.e. compression and tension) of the sliders. In the preferred embodiment, two vehicles are connected, rear end to rear end, by two lift links of the present invention. The lift links when installed between two vehicles on flat ground are approximately parallel to each other and horizontal to the ground with each link located approximately the same height above the ground. Slings deployed from a helicopter are then attached to the front and to the rear of each vehicle and the vehicles are lifted and transported as a unit. The present invention maintains the vehicles in a spaced relationship while in flight yet provides at least four degrees of movement to facilitate hook-up. A pair of lift links may be easily carried and stored on a vehicle yet weigh only approximately 25 lbs each.

BRIEF DESCRIPTION OF THE DRAWINGS

FIG. 2 is an enlarged side view of the lift link shown in FIG. 1, showing pivotal motion at both ends and axial motion in the center section.

FIG. 3 is a top view taken through section 3—3 of FIG. 2, showing pivotal motion at both ends.

FIG. 4 is a cross section side view taken through section 4—4 of FIG. 3, showing the lift link of the present invention installed between two vehicles.

FIG. 5 is a cross section top view taken through section 5—5 of FIG. 2, showing the lift link of the present invention installed between two vehicles.

DETAILED DESCRIPTION OF THE PREFERRED EMBODIMENT

Figure 1:
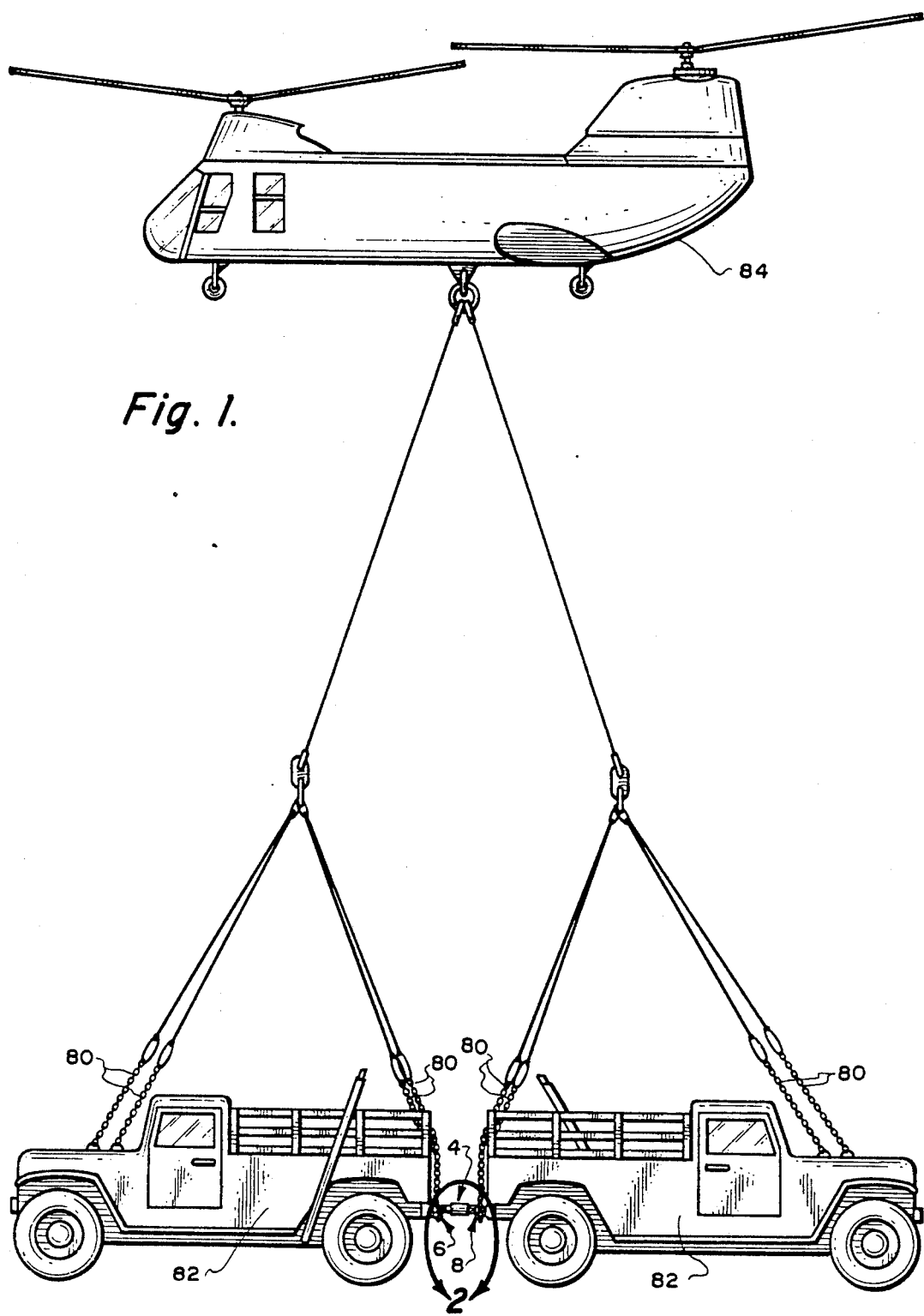
FIG. 1 is an illustration showing a helicopter lifting two vehicles linked together by the lift link of the present invention.

The preferred embodiment of the present invention is illustrated by way of example in FIGS. 1-5. As shown in FIGS. 2, 3, 4 and 5, lift link 4 includes first end 6 and second end 8, both ends substantially identical. For purposes of clarity, only the elements of first end 6 will be described in detail, the corresponding elements of second end 8 being designated with the same numerical designation but followed with a prime (') marking. The outer end of first end 6 terminates in the form of a clevis which includes ear 10, ear 12, top brace 14, bottom brace 16 and back 18. The inner end of first end 6 terminates in the form of ear 20. Lug 22 is attached to ear 10 and lug 24 is attached to ear 12. The elements of first end 6 may be attached, for example, by welding or may be formed by other suitable means such as casting, forging or machining. Bolt 26 is slidably fitted through bores 28 and 30 and retained by nut 32 as shown in FIGS. 2 through 5. As can be seen in FIGS. 2 and 4, back 18 is flush with ear 10 and ear 12 on the "top" side but extends below ear 10 and ear 12 on the "bottom" side, the extension forming a lip 19. When lift link 4 is installed between two vehicles 86 (see FIG. 1) and in operation, lifting slings 80 extend from helicopter 84 and wrap around first end 6 and second end 8. As shown in FIGS. 2 and 4, lips 19 and 19' act to retain lifting slings 80 in place while lifting vehicles 86.

Inner slider 34 includes body 38, end cap 40, ear 42, ear 44, lug 46, lug 48 and stop 50 and are attached, for example, by welding. Outer slider 36 includes body 52, end cap 54, ear 56, ear 58, lug 60, lug 62 and stop 64 and are attached, for example, by welding. It should be noted that the inner and outer surfaces of body 38, stop 50, body 52, and stop 64 are round. In this way, the outer surface of body 38 is in slidable contact with the inner surface of stop 64. Similarly, the outer surface of stop 50 is in slidable contact with the inner surface of body 52. Diametral clearance between body 38 and stop 64 and between stop 50 and body 52 is approximately 0.200 inch. In this way, inner slider 34 and outer slider 36 may be extended or compressed, the extension limited by stop 50 contacting washer 66 and the compression limited by stop 50 contacting end cap 54. The range of extension/compression motion provided in the preferred embodiment is approximately 2⅜ inches.

First end 6 and second end 8 are pivotally attached to inner slider 34 and outer slider 36 respectively by pins 35 and 37 respectively as shown in FIGS. 2, 4 and 5. Pin 35 is retained in bore 39 and pin 37 is retained in bore 40. Bore 39 is located in ears 42 and 44 and bore 40 is located in ears 56 and 58 all shown in FIG. 4. Lugs 46, 48, 60 and 62 retain pins 35 and 37 in their respective bores. As shown by motion arrows 11 and 11' in FIG. 3, first end 6 and second end 8 may pivot about pins 35 and 37 respectively, each end having a total range of motion of approximately 24 degrees. The range of motion for first end 6 is limited in one direction by edge 68 contacting surface 70 of end cap 41 (see FIG. 5) and limited in the other direction by edge 72 contacting surface 70 of end cap 41. Similarly, the range of motion of second end 8 is limited by edges 74 and 76 contacting surface 78 of end cap 54.

All components of the lift link of the present invention are fabricated from steel. The center to center distance between bolts 26 and 26' is approximately 15 inches in the fully compressed state and approximately $17\frac{3}{8}$ inches in the fully extended state. Bolts 26 and 26' are SAE $\frac{5}{8}$-11 and approximately $6\frac{1}{2}$ inches long. The distance between the inner surfaces of ears 10 and 12 is approximately $3\frac{1}{8}$ inches. Ear 20 is approximately 1 inch thick while all other elements of first end 10 are approximately $\frac{3}{8}$ inches thick. Second end 8 is substantially identical to first end 6. Pins 35 and 37 are approximately 9/16 inches in diameter. Body 38 of inner slider 34 is approximately $3\frac{1}{2}$ inches in outside diameter with a wall thickness of approximately $\frac{3}{8}$ inches and body 52 of outer slider 36 is approximately $4\frac{1}{2}$ inches in outside diameter with a wall thickness of approximately $\frac{3}{8}$ inches.

It should be noted that suitable attachment points are located on the vehicles to be joined. These attachment points, (shown in FIGS. 1, 2, 3 and 4) may be in the form of ears 82 with bores 83 located therein. In operation, bolt 26 is removed from first end 6 whereupon first end 6 is slidably aligned over an attachment point 82 located on a first vehicle to be joined. Bores 28 and 30 are then aligned with bore 83 in attachment point 82 and bolt 26 is slidably inserted through the aligned bores. Nut 32 is used to secure bolt 26. In the same manner, second end 8 is attached to a second vehicle by positioning the second vehicle in such a way that attachment point 82 of the second vehicle is in the proximity of second end 8. Second end 8 is then slidably aligned over attachment point 82 on the second vehicle and bolt 26' is inserted through aligned bores. Nut 32' is used to secure bolt 26'.

Obviously many modifications and variations of the present invention are possible in light of the above teachings. It is therefore to be understood that within the scope of the appended claims, the invention may be practiced otherwise than as specifically described.

What is claimed is:

1. A lift link for attaching two vehicles to be lifted and moved about comprising:
    a) a center portion providing both axial and rotating movement for the lift link before, during and after a lift, wherein the axial movement is along the axis of said lift link and the rotating movement is about the axis of said lift link, said axis extending from the attachment point of said lift link to the first vehicle to the attachment point of said lift link to the second vehicle;
    b) a first end pivotally attached to one end of the center portion;
    c) a second end pivotally attached to the other end of said center portion;
    d) means located at the outermost portion of both the first and second ends for pivotally attaching said first end to the first vehicle and for pivotally attaching said second end to the second vehicle;
    e) means located on said first and second ends for retaining lifting slings in place.

2. The lift link defined in claim 1, wherein said center portion comprises sliders.

3. The lift link defined in claim 2, wherein said sliders include inner and outer members.

4. The lift link defined in claim 3, wherein the inner and outer members include stops to permit limited axial movement.

5. The lift link defined in claim 4, wherein said inner and outer members are circular.

6. The lift link defined in claim 5, wherein said inner and outer members have a range of movement of $2\frac{3}{8}$ inches.

7. The lift link defined in claim 5, wherein said inner and outer members have a range of movement of up to $2\frac{3}{8}$ inches.

8. The lift link defined in claim 5, wherein said inner and outer members have a range of movement of greater than $2\frac{3}{8}$ inches.

9. The lift link defined in claim 1, wherein the means for retaining the lifting slings in place are lips.

10. The lift link defined in claim 1, further including means for limiting the pivotal movement of said first and second ends relative to said center portion.

11. The lift link defined in claim 10, wherein the pivotal movement of said first and second ends is more than twenty-four degrees at each end.

12. The lift link defined in claim 10, wherein the pivotal movement of said first and second ends is up to twenty-four degrees at each end.

13. The lift link defined in claim 10, wherein the pivotal movement of said first and second ends is twenty-four degrees at each end.

14. The lift link defined in claim 1, wherein the attaching means are in the form of clevises.

15. The lift link defined in claim 9, further including means for limiting the pivotal movement of said first and second ends relative to said center portion.

16. The lift link defined in claim 10, wherein the attaching means are in the form of clevises.

17. The lift link defined in claim 14, wherein the means for retaining the lifting slings in place are lips.

18. The lift link defined in claim 15, wherein the attaching means are in the form of clevises.

* * * * *